United States Patent [19]
Cobden

[11] Patent Number: 4,501,089
[45] Date of Patent: Feb. 26, 1985

[54] FROST CONTROL

[75] Inventor: Kenneth J. Cobden, Mildura, Australia

[73] Assignee: Cobden Turbines Pty. Ltd., Mildura, Australia

[21] Appl. No.: 446,723

[22] Filed: Dec. 3, 1982

[30] Foreign Application Priority Data

Aug. 10, 1982 [AU] Australia .................... PF5308

[51] Int. Cl.³ .................................... A01G 13/00
[52] U.S. Cl. ......................................... 47/2
[58] Field of Search ............. 47/2; 416/187, 188; 415/210, 215

[56] References Cited

U.S. PATENT DOCUMENTS

| | | | |
|---|---|---|---|
| 2,165,148 | 7/1939 | Nelson et al. | 47/2 |
| 2,418,012 | 3/1947 | Chester | 416/187 |
| 4,087,994 | 5/1978 | Goodloxson | 416/188 |

Primary Examiner—Robert A. Hafer
Assistant Examiner—Bradley M. Lewis
Attorney, Agent, or Firm—Pearne, Gordon, Sessions, McCoy, Granger & Tilberry

[57] ABSTRACT

A frost minimization or prevention machine comprising a fan to draw air downwardly from above the crop to be protected and disperse the air horizontally over the crop. Ideally the fan draws down warmer air from above the inversion layer.

5 Claims, 6 Drawing Figures

FROST CONTROL

This invention relates to frost control, more particularly to the control of frosts on agricultural and horticultural crops.

BACKGROUND OF THE INVENTION

In the agricultural areas, particularly with orchids, frost damage can occur to vast areas with consequential dire results to the orchardist. As is well known this occurs due to the freezing of the moisture in the plant leaves which causes rupture and destruction of the cells of the leaf. This can occur on various plants and trees, not only particularly frost sensitive plants, etc. as tomatoes, but also in other orchid plants such as citrus trees, avocados, grape vines and the like. With grape vines, damage can occur with late frosts affecting the buds, for even with grape vines the bunch is in effect formed in the bud, and frost can affect the fruiting buds and thus the crop can be severely damaged at this early stage of the bud development. Also damage can occur to the leafing buds so that the desired laterals are not formed thus affecting the vine growth for a number of years.

Attempts to alleviate the frost damage have been made by the provision of large fans blowing air horizontally over the area to be protected, these fans being axial flow fans with their axes generally horizontal to the ground.

While these are satisfactory to some extent, they are limited in their application in that the area protected is only that directly in front of the large fan or propeller type unit.

It is well known that in frost conditions a temperature inversion layer occurs, with the cold air being situated close to the ground while at a higher elevation there is a layer of warmer air. This inversion layer can occur from a few centimeters or a meter above the ground or to a higher level such as ten or twenty meters.

It is an object of the invention to provide a means whereby the warmer air above the inversion layer is drawn downwardly and then dispersed to achieve a frost nullifying effect, not only by the provision of the warmer air, but by providing air movement, however small, over the areas to be protected.

BRIEF STATEMENT OF THE INVENTION

There is provided according to the invention a method of frost control for agricultural and horticultural crops, the method including the steps of drawing the air generally downwardly, and then dispersing it generally horizontally to thus create an air flow over the area to be protected.

In a further aspect of the invention there is provided a frost control apparatus, the apparatus comprising a fan providing means to draw the air downwardly from a level above the area to be protected and then dispersing this air generally horizontally over the area to be protected.

DESCRIPTION OF THE PREFERRED EMBODIMENTS

Figure 1:
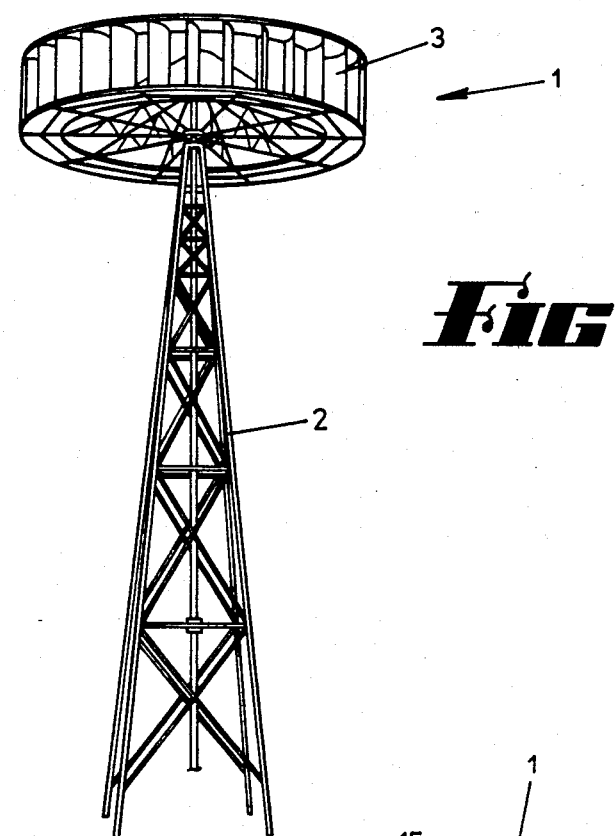
FIG. 1 is a perspective view of one form of the apparatus.
Figure 2:
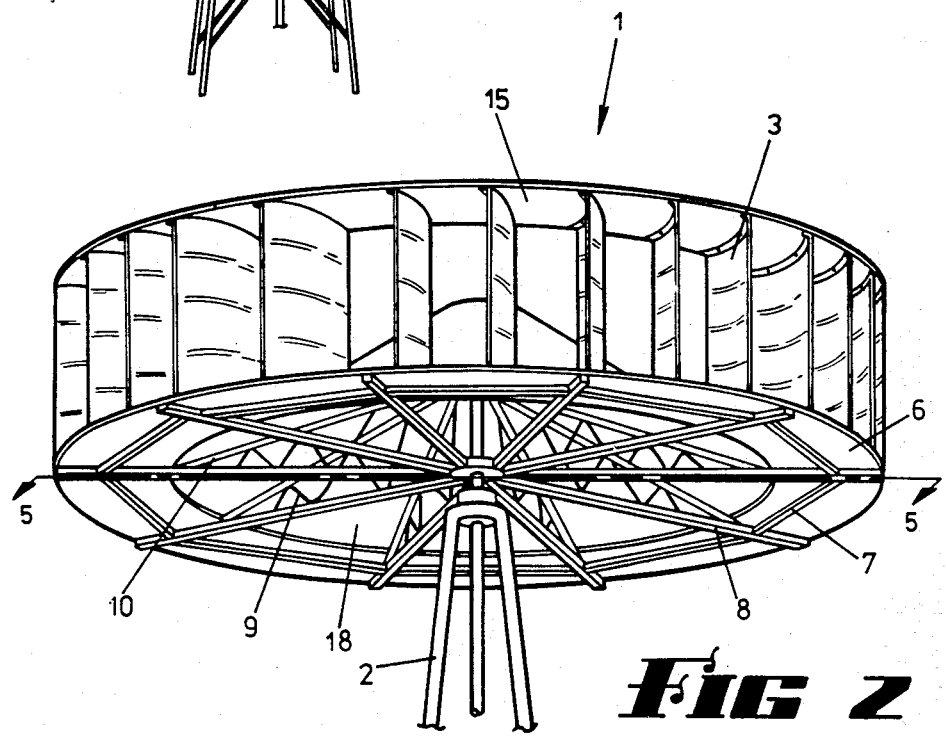
FIG. 2 is a perspective view from underneath the apparatus.
Figure 3:
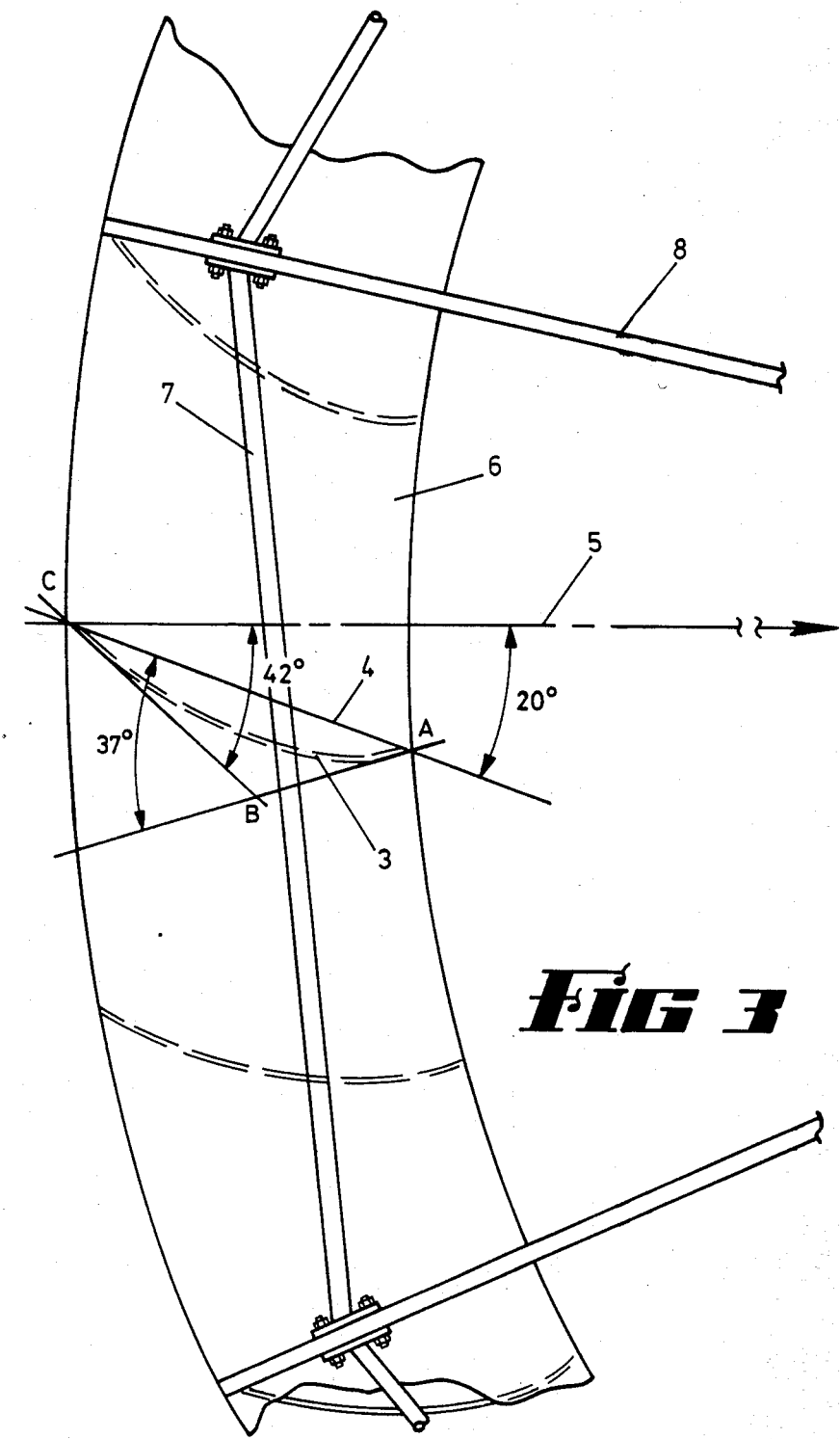
FIG. 3 is a plan view of part of the rotor.
Figure 4:
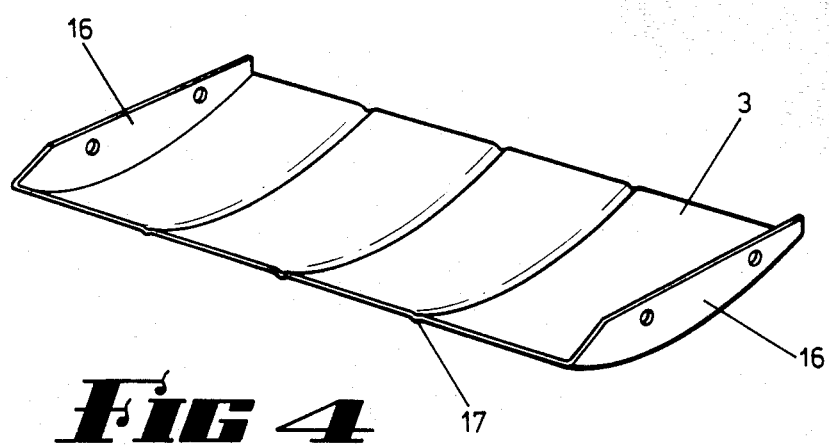
FIG. 4 is a perspective view of one of the blades.
Figure 5:
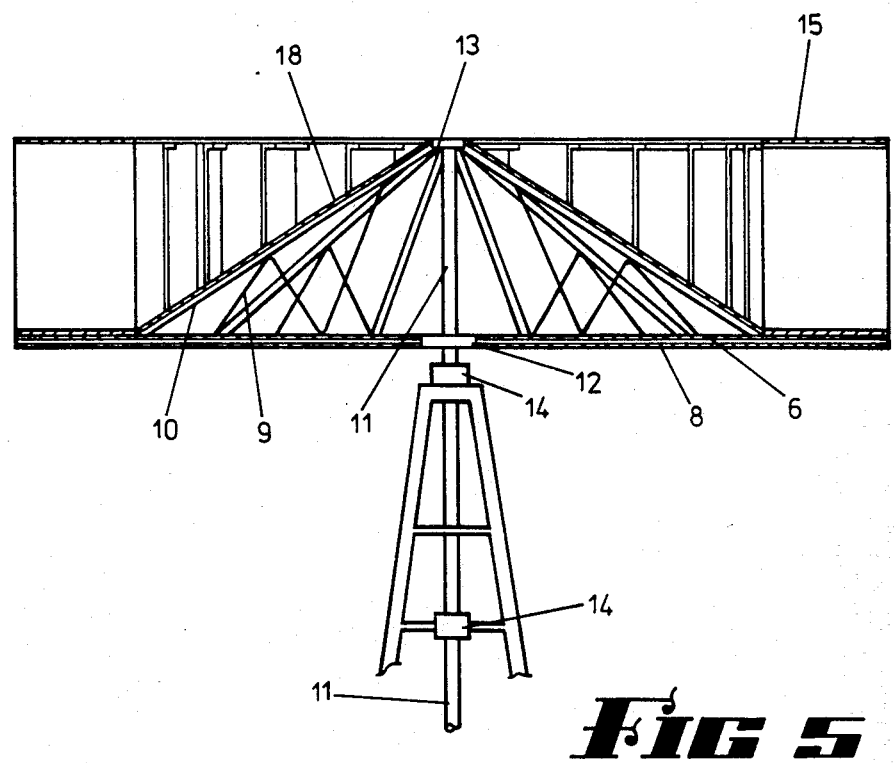
FIG. 5 is a cross-section of the apparatus.

As shown in FIGS. 1 to 5 the invention comprises a radial flow fan 1 mounted on a tower 2, the axis of the fan 1 being mounted vertically. The fan can be of substantial size such as having a diameter in the order of 4 meters, with the blades 3 of the fan curved and having their cord line 4 at an angle to the radius 5 of the fan, so that on rotation of the fan the air is drawn axially into the turbine and then thrown outwardly by the blades.

The blades 3 are mounted on a support ring or annular 6 attached to a spider frame work comprising bars 7 joining radius bars 8 forming the lower member of triangular trusses 9. The other members 10 of the trusses are joined to a support 13 on the upper end of the power shaft 11, the radius bars 8 also being joined to a support 12 on the shaft 11 so that the shaft 11 rotates the fan.

The shaft 11 is supported in bearings 14 in the upper end of the tower.

The upper ends of the blade 3 are joined by an upper annulus ring 15, each of the blades 3 having flanges 16 whereby the blades are riveted or bolted to the respective rings 6 and 15. Each blade is pressed from sheet metal and can be formed with a stiffening crease or groove 17.

Each of the blades is shaped to have an aerofoil section so that the leading edge is straight for approximately one third of its length along the line A—B, and similarly the trailing edge is straight for approximately one third of its length along the line angle B—C.

The cord line A—C is preferably situated between 15 and 25 degrees, but more particularly 20 degrees from the radial line, and the leading edge angle A—B is situated between 30 and 40 degrees from the cord line more particularly 37 degrees, while the trailing edge line B—C being sitated between 35 and 50 degrees, more particularly 42 degrees from the radial line.

With the blades so arranged, the point of highest position of the aerofoil section of the blade is situated toward the leading edge of the blade.

As noted above the fan can be up to 4 meters or more in diameter, and can be mounted on a tower up to 10 to 15 meters in height. The blades are spaced from each other, and for a 4 meter fan, a total of 30 blades are circumferentially spaced. The fan rotates at a speed of 60 revolutions per minute, but at higher speed the power requirements increase substantially.

The vertical power shaft passes downwardly through the tower on suitable bearings at the lower end, and is provided at this end with a right angle drive so that it can be connected to any power source, such as the power take off of a tractor, a stationary internal combustion engine, or an electric motor, the right angle drive can incorporate various gear reduction mechanisms as desired depending upon the power source.

A deflecting cone 18 is provided over the triangular truss, so that the air is drawn downwardly to be expelled radially.

The bottom of the fan can be opened by removing the cone 18, so that the air can also be drawn upwardly and then expelled radially outwardly, so that once the unit has been operating for a period of time a circulation of air will exist, there being two circulation patterns, one radially outwardly downwardly and then back underneath the fan to be recirculated, the other passing upwardly through the inversion layer and then downwardly again to be recirculated.

In this way the air is dispersed radially outwardly over the area to be treated thus causing a gentle air flow over the crop so that frost formation is virtually eliminated. It has been found that up to 15 or 20 acres can be effectively treated from the one fan unit.

Ideally the unit would be positioned in the midst of the area to be treated so that the air can then be discharged radially in all directions.

Alternatively the unit is to be situated on the edge or end of an area, then suitable ducting and shielding can be provided to shield the area not required to be treated and have all the air directed in the direction required.

Figure 6:
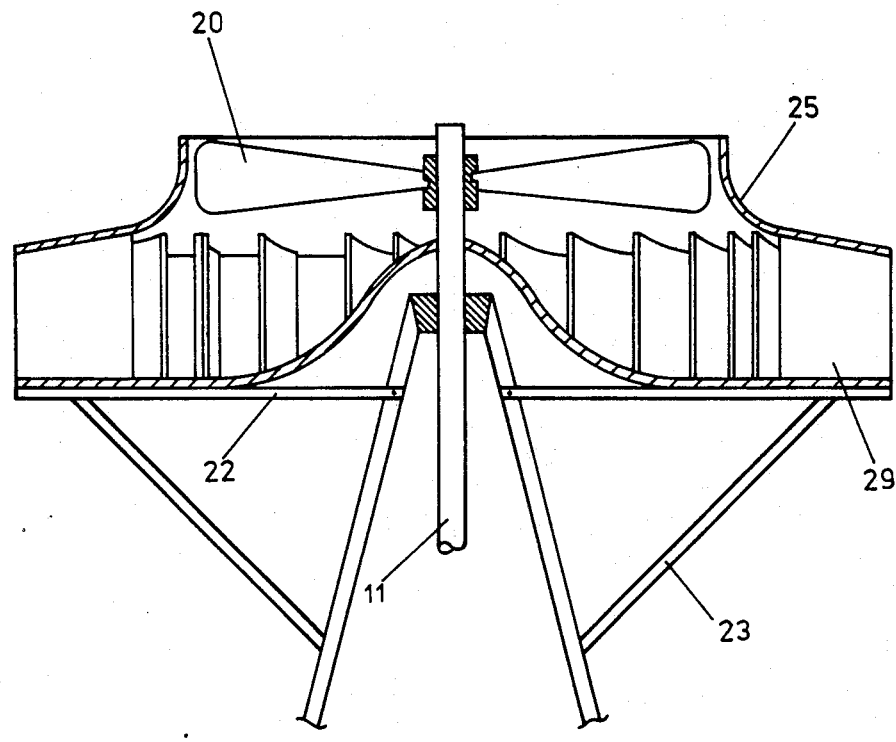
FIG. 6 is a cross-section of an alternative form of apparatus.

Referring to FIG. 6, there is shown a further alternative of the invention in which the tower 2 supports an axial fan 20, the fan being driven by the shaft 11.

Below the fan 20, the tower supports a circular deflector 21 on struts 22-23, so that the downwardly directed air is deflected to flow horizontally from the fan. Straightening vanes 24 support a further guide 25 so that the air is further guided in the horizontal direction radially in all directions of the fan.

Thus it will be seen that there is provided according to the invention a method and apparatus whereby a circulation of air is provided, this ideally drawing the warmer air from above the inversion layer downwardly to be discharged horizontally over the area to be protected, and it is to be realised that various forms of fans can be provided to achieve this result.

The claims defining the invention are as follows.

I claim:

1. Apparatus for the frost control of agricultural and horticultural crops, said apparatus comprising a tower supporting at its upper end a radial flow fan, means to drive said fan to rotate about a vertical axis to draw air axially into the fan from above the inversion layer and discharge this air radially over the crop, said fan including a plurality of peripheral aerofoil shaped vertical blades mounted on an annular ring at the periphery of the fan, each blade being curved with a convex surface thereof facing in the direction of rotation and having a leading edge and a trailing edge, said convex surface including a straight portion adjacent the leading edge, a curved central portion and a straight portion adjacent the trailing edge, the cord line of the said blades being between 15° and 25° from a radial line of the fan, the point of highest position from the cord line being toward the leading edge of the blade, the leading edge being innermost and the trailing edge being at the periphery of the fan whereby on rotation the air flows axially into the fan interior intermediate said blades and then curves to have a generally radial component before being encountered by the blades.

2. Apparatus as defined in claim 1, characterized in that the first-mentioned annular ring is positioned below said vanes and a second annular ring is positioned above the vanes, said vanes also being mounted to the second annular ring, the annular rings being located in substantially parallel and axially spaced planes which intersect the vertical axis of the fan.

3. Apparatus as defined in claim 2, characterized in that the fan includes a power shaft extending along the vertical axis thereof and support members mounting said first-mentioned annular ring to the power shaft, said support members being connected to the power shaft adjacent each of the axially spaced planes.

4. Apparatus as defined in claim 3, characterized in that deflecting means positioned within the interior of the fan and surrounded by the annular rings direct air flow downwardly into the fan and radially outward.

5. Apparatus as defined in claim 4, characterized in that the deflecting means comprise a cone member having a base located adjacent the plane of the first-mentioned annular ring and extending upwardly to a top located adjacent the plane of the second annular ring.

* * * * *